(12) United States Patent
Post

(10) Patent No.: US 7,843,913 B2
(45) Date of Patent: Nov. 30, 2010

(54) METHOD OF OPERATING A SCHEDULER OF A CROSSBAR SWITCH AND SCHEDULER

(75) Inventor: Georg Post, La Ville du Bois (FR)

(73) Assignee: Alcatel, Paris (FR)

( * ) Notice: Subject to any disclaimer, the term of this patent is extended or adjusted under 35 U.S.C. 154(b) by 568 days.

(21) Appl. No.: 11/477,590

(22) Filed: Jun. 30, 2006

(65) Prior Publication Data

US 2007/0019638 A1    Jan. 25, 2007

(30) Foreign Application Priority Data

Jul. 22, 2005    (EP) .................................. 05291580

(51) Int. Cl.
*H04L 12/56* (2006.01)
(52) U.S. Cl. ...................... 370/389; 370/395.4; 370/428
(58) Field of Classification Search ................. 370/360, 370/380, 384, 387, 388, 236, 395.4; 710/240–243
See application file for complete search history.

(56) References Cited

U.S. PATENT DOCUMENTS

| | | | | |
|---|---|---|---|---|
| 5,694,121 | A * | 12/1997 | Krause et al. | 710/40 |
| 5,710,549 | A * | 1/1998 | Horst et al. | 710/40 |
| 6,570,883 | B1 * | 5/2003 | Wong | 370/412 |
| 6,836,479 | B1 * | 12/2004 | Sakamoto et al. | 370/389 |
| 7,023,840 | B2 * | 4/2006 | Golla et al. | 370/360 |
| 7,154,885 | B2 * | 12/2006 | Nong | 370/380 |
| 7,274,690 | B1 * | 9/2007 | Park et al. | 370/388 |
| 7,324,452 | B2 * | 1/2008 | Xu et al. | 370/236 |
| 7,350,003 | B2 * | 3/2008 | Gish et al. | 710/241 |
| 7,646,779 | B2 * | 1/2010 | Kumar et al. | 370/408 |
| 2003/0031193 | A1 * | 2/2003 | Andrews et al. | 370/412 |
| 2003/0159021 | A1 * | 8/2003 | Kerr et al. | 712/218 |
| 2004/0165598 | A1 | 8/2004 | Shrimali et al. | |

OTHER PUBLICATIONS

Shin E S et al: "Round-robin arbiter design and generation." ISSS, Oct. 2, 2002, pp. 243-248.
Zheng S Q et al: "A simple and fast parallel round-robin arbiter for high-speed switch control and scheduling." Aug. 4, 2002, pp. 671-674.

* cited by examiner

*Primary Examiner*—Jayanti K Patel
*Assistant Examiner*—Matthew Campbell
(74) *Attorney, Agent, or Firm*—Carmen Patti Law Group, LLC

(57) ABSTRACT

The present invention relates to a method of operating a scheduler (100) of a crossbar switch (200), wherein said scheduler (100) comprises a tree structure comprising an input stage (IS) with a plurality of entry modules (E_1, E_2, . . . ) and at least one decider stage (DS_1, DS_2, . . . ), wherein each decider stage (DS_1, DS_2, . . . ) comprises at least one decider module (D_1_1, D_2_1, . . . ), wherein one or more modules (E_1, E_2, D_1_1, D_1_2, . . . ) are connected to a decider module (D_1_1, D_2_1, . . . ) of a subsequent decider stage (DS_1, DS_2, . . . ), wherein a packet reference is forwarded from said input stage (IS) or a decider stage to a subsequent decider stage depending on a forwarding decision that is made in a decider module (D_1_1, D_2_1, . . . ) characterized by the following steps: providing each packet reference with at least one individual attribute, storing accounting information for each of said modules (E_1, E_2, D_1_1, D_1_2), wherein said accounting information depends on the packet references and/or the individual attribute(s) of the packet references which are processed by the respective module (E_1, E_2, D_1_1, D_1_2), and making the forwarding decision depending on said accounting information.

20 Claims, 2 Drawing Sheets

METHOD OF OPERATING A SCHEDULER OF A CROSSBAR SWITCH AND SCHEDULER

BACKGROUND OF THE INVENTION

The invention is based on a priority application EP05291580.8 which is hereby incorporated by reference.

The present invention relates to a method of operating a scheduler of a crossbar switch, wherein said scheduler comprises a tree structure comprising an input stage with a plurality of entry modules and at least one decider stage, wherein each decider stage comprises at least one decider module, wherein one or more modules are connected to a decider module of a subsequent decider stage, wherein a packet reference is forwarded from said input stage or a decider stage to a subsequent decider stage depending on a forwarding decision that is made in a decider module.

The present invention further relates to a scheduler wherein said scheduler comprises a tree structure.

Operating methods and schedulers of the aforementioned type are known from prior art and are used to control crossbar switches. Existing schedulers having a tree structure only provide for non-weighted scheduling. Furthermore, cell schedulers are known which have the disadvantages of not being capable of handling variable packet sizes and/or priorities. Schedulers based on the round-robin principle add jitter to packet data flows.

SUMMARY OF THE INVENTION

Consequently, it is an object of the present invention to provide an improved method of operating a scheduler of a crossbar switch as well as an improved scheduler of a crossbar switch which overcome the aforementioned disadvantages of prior art systems.

According to the present invention, concerning the above-mentioned method this object is achieved by the following steps:
  providing each packet reference with at least one individual attribute,
  storing accounting information for each of said modules, wherein said accounting information depends on the packet references and/or the individual attribute(s) of the packet references which are processed by the respective module, and
  making the forwarding decision depending on said accounting information.

The inventive individual attributes of the packet references enable to collect information on a plurality of packets or packet references, respectively, that are processed by the inventive scheduler. Said information is stored in form of accounting information which enables to make a forwarding decision depending on previously processed packet references.

According to an advantageous embodiment of the inventive method, said individual attributes comprise a packet size and/or a weight of a packet represented by said packet reference. This enables to make the forwarding decision and thus schedule packets depending on their size, i.e. the inventive method is not limited to a fair scheduling of packets with a fixed length. Furthermore, by providing said weight as a further individual attribute, it is possible to implement a priority-based scheduling with the inventive method.

A further advantageous embodiment of the present invention proposes to store the accounting information for a specific module within a decider module of a subsequent decider stage to which the specific module is connected, whereby the information required for making further forwarding decisions is allocated directly at the place where it must periodically be evaluated. For example, accounting information related to an entry module of the input stage is stored within a decider module of a first decider stage said entry module is connected to. Accounting information related to further entry modules connected to the same decider module of the first decider stage is also stored within said decider module. However, the accounting information related to said decider module of the first decider stage itself is correspondingly stored in a decider module of a second decider stage to which the decider module of the first decider stage is connected, and so on.

Another advantageous embodiment of the present invention is characterized in that said accounting information is represented by a numerical balance value, which enables an efficient processing of the accounting information, e.g. an efficient comparison or the like.

Another advantageous embodiment of the present invention is characterized in that the step of making the forwarding decision comprises a step of comparing the balance values of at least two modules which are connected to a specific decider module. Since the balance values of said modules contain information on individual attributes of previously processed packet references, the inventive comparison enables to implement a fair scheduling method which necessarily requires to consider previous forwarding decisions.

According to a further variant of the present invention, a packet reference of the module with the largest balance value is forwarded to a subsequent decider stage and may thus be considered as a winner with respect to the current forwarding decision.

A current balance value, which represents accounting information of a currently processed packet reference in numerical format, may e.g. be determined as a product of the packet size of the packet represented by said packet reference of the module with the largest balance value and the weight of a packet represented by another packet reference.

In this embodiment, the inventive method further proposes to subtract said current balance value from the largest balance value, i.e. from the balance value of the module processing the packet reference denoted as a winner, and to add said current balance value to each of the balance values of the remaining modules. Thus, the chances of the remaining modules for winning a future forwarding decision are increased and the chance of the current winner is correspondingly decreased which enables a fair scheduling.

Since a balance value comprises a product of the packet size and the weight, both attributes are considered in the aforedescribed variant of the inventive method. It is also possible to include further individual attributes of packets/packet references to provide for an even more elaborate mechanism of maintaining fairness.

According to a very advantageous embodiment of the present invention, the tree structure of the scheduler is a binary tree structure, i.e. two modules are connected to one decider module of a subsequent decider stage. For example, two entry modules are connected to a decider module of a first decider stage, and two decider modules of said first decider stage are connected to a decider module of a second decider stage, etc.

Another advantageous variant of the inventive method is characterized in that a packet reference is forwarded from a first module of a first stage to a decider module of a subsequent decider stage without said step of comparing balance values, if there is no packet reference waiting to be forwarded in the second module connected to said decider module. I.e., whenever only one of a plurality of modules connected to a decider module of a subsequent decider stage contains a packet reference which is to be forwarded, said packet reference may directly be forwarded without the inventive comparison.

According to a further advantageous embodiment of the present invention, a weight of the packet corresponding to the forwarded packet reference is incremented.

Advantageously, the weight increment is equal to the weight of a competing packet reference. This ensures the appropriate weighted fairness between aggregate data flows that compete at a subsequent decider stage.

Yet another advantageous embodiment of the present invention is characterized in that said individual attribute(s) of the packet references additionally comprise a priority class. The priority class may e.g. be used to control the forwarding decision so as to enable a strict priority handling in the scheduler in addition to aforedescribed use of the packet weight.

For instance, said forwarding decision may only depend on said priority class if there are packet references contending to being forwarded to a subsequent decider module that have different priority classes. I.e., if there are only packet references having the same priority class, the priority class of these packet references is not considered when making the forwarding decision.

Otherwise, i.e., if there are packet references having different priority classes, the forwarding decision may be made only depending on said priority classes and independent of the above described balance value. Thereby, a strict priority handling may be achieved since it is possible to neglect the balance value according to which a forwarding decision may have another result as compared with a forwarding decision that is solely based on the priority class.

Another advantageous embodiment of the inventive method implements three processes in the scheduling tree system, which are triggered by separate input signals or events, respectively:
  an incoming packet event,
  an outgoing packet event, and
  a scheduling step Advantageously, all entry modules have a counter of waiting packets. Further, all entry modules and all decider modules have two status flags, "free" and "winning", which control the forwarding steps.

A specific module is "free" if it holds no packet reference.

A specific module is "winning" if: a) it is not "free", and b) a decider module of a subsequent decider stage to which said specific module is connected is "free" or "winning", and c) the comparisons with competing module(s) design said specific module as the winner, or if the competing opponent module(s) is/are "free".

On each incoming packet event, an incoming packet's reference typically comprises the attributes: size, weight, priority class, output channel number, and entry module where the packet is to be classified. The packet reference is stored in a buffer memory. The packet body of the incoming packet is stored in a queue memory, and a waiting-packet counter stored in the entry module receiving said incoming packet or the packet reference of said incoming packet, respectively, is incremented.

On each outgoing packet event, if there is a packet reference at the last decider stage, it is retrieved, and the corresponding packet body is read from said queue memory and forwarded to the output channel according to said channel number. Subsequently, the module of said last decider stage is marked as "free".

On each scheduling step, processing is parallel in all decider modules as well as in the input modules: packet references inside the decision tree of the inventive scheduler are forwarded from "winning" modules to the respective modules of subsequent decider stages. Furthermore. the "free" flags of all decider modules and entry modules are updated as a function of the moves, i.e. depending on which packet references have been forwarded.

At the input stage, one new packet reference is copied from buffer memory to an entry module if said entry module is qualified, i.e. said entry module is "free" or "winning" and its waiting-packet counter is positive. Correspondingly, said waiting-packet counter of the entry module is then decremented.

Furthermore, on each scheduling step, balance values and weights are updated in the decider modules. The "winning" flags are updated in preparation of the next scheduling step.

In an advantageous embodiment, the inventive scheduler is synchronously clocked, i.e. one scheduling step or forwarding step, respectively, is executed per clock period or time slot, respectively. Simultaneously, if requested, the inventive scheduler executes one incoming and/or one outgoing packet event.

According to a further advantageous embodiment of the present invention, the clock rate is higher, for example by a factor of two, than a fastest rate of outgoing packet events. In this case, the scheduling steps can accumulate enough competing packet references in the scheduler tree.

In another advantageous embodiment, the qualified entry module that receives a new packet reference in the scheduling step is chosen by means of a simple round-robin sequencer.

Yet another embodiment restricts the scheduling parallelism: per clock period, in each decider stage at most a single decider module can forward a reference. Note: this is automatically the case when few packet references in the tree are "empty". A round-robin sequencer per decider stage, for example, may select the forwarded packet reference when more than one packet could win.

The advantages are reduced hardware resources such as:
1. one shared multiplier unit per decider stage, instead of one per decider module,
2. a common memory for the packet attributes and accounting informations that belong to the same stage, instead of separate register sets per module.

A further solution to the object of the present invention is given in form of a scheduler according to claim 13.

The inventive scheduler comprises a tree structure comprising an input stage with a plurality of entry modules and at least one decider stage, wherein each decider stage comprises at least one decider module, wherein one or more modules are connected to a decider module of a subsequent decider stage, wherein said scheduler is configured to forward a packet reference from said input stage or a decider stage to a subsequent decider stage depending on a forwarding decision that is made in a decider module. The inventive scheduler further comprises an attribute memory for storing at least one individual attribute of each packet reference and an accounting memory for storing accounting information for each of said modules, wherein said accounting information depends on the packet references and/or the individual attribute(s) of the packet references which are processed by the respective module.

According to a further advantageous embodiment of the inventive scheduler, each decider module comprises a comparator. It is further possible to provide each decider module with a multiplier and/or an adder so as to enable an efficient scheduling according to the inventive method. The inventive scheduler preferably comprises a binary tree structure.

A further advantageous embodiment of the present invention is characterized by comprising said tree structure with an input stage and at least one decider stage for each output of said crossbar switch.

Even further, the inventive method and apparatus is not limited to being used with a crossbar switch. It is also possible to employ the inventive method and apparatus with other packet aggregation devices such as e.g. routers traffic managers and the like.

BRIEF DESCRIPTION OF THE DRAWINGS

Further details and advantages of the present invention are given in the following detailed description with reference to the drawings, in which.

Figure 1:
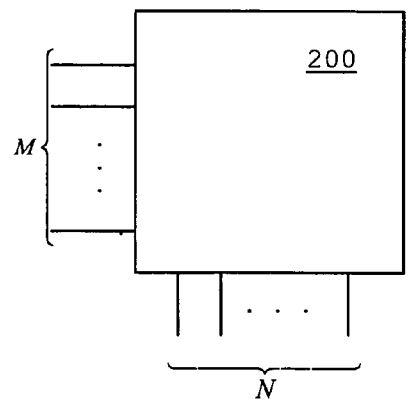
FIG. 1 depicts a crossbar switch.

The crossbar switch 200 of FIG. 1 comprises M input ports and N output ports and is capable of routing a packet received at one of said M input ports to one or more of said N output ports.

Figure 2:
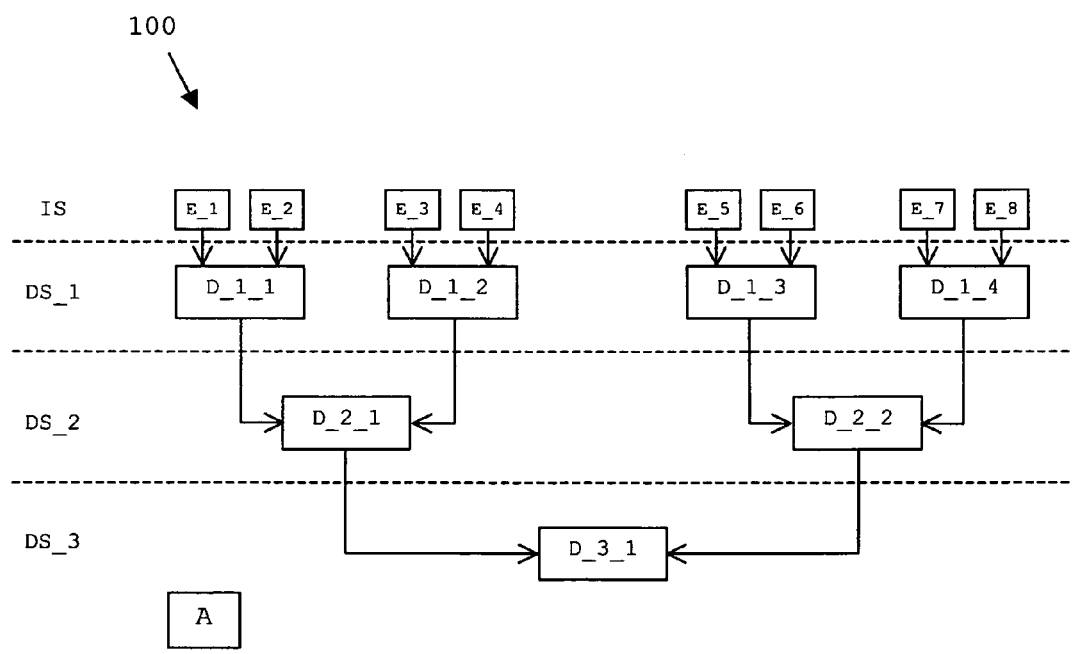
FIG. 2 depicts a first embodiment of the inventive scheduler.

For each of said N output ports a scheduler 100 as depicted in FIG. 2 is provided within the crossbar switch 200 in order to determine which of a plurality of ingress packets requiring to be routed to the same specific output port is routed to that output port first. Once such a packet is determined, the scheduler 100 generates proper control signals for a crossbar core (not shown) to set up a corresponding path through the crossbar switch.

The inventive scheduler 100 has a binary tree structure comprising various stages IS, DS_1, DS_2, DS_3.

At its input stage IS, the scheduler 100 comprises a plurality of entry modules E_1, . . . , E_8. The number of entry modules E_1, . . . , E_8 corresponds to the number M of input ports of the crossbar switch 200 of FIG. 1 and is chosen to be eight for the present example, i.e. M=8.

Each entry module E_1, . . . , E_8 is assigned to one of the M=8 input ports of the crossbar switch 200, and whenever an ingress packet is received at an input port of the crossbar switch 200, a packet reference representing said packet is entered into the respective entry module E_1, . . . , E_8 of the scheduler 100 if the ingress packet is to be output at a specific output port of the crossbar switch 200 the scheduler 100 of FIG. 2 is assigned to.

After this, a number of forwarding decisions is made by the inventive scheduler in its decider stages DS_1, DS_2, DS_3, to determine a packet which is to be routed to said specific output port. Due to the binary tree structure of the inventive scheduler 100, the number of decider stages DS_1, DS_2, DS_3 is proportional to the logarithmus dualis of the number of input ports, i.e. ld(M=8)=3. Correspondingly, in the present example, the decider stage DS_3 is the last decider stage and thus the packet reference determined to be forwarded by the decider module D_3_1 of said decider stage DS_3 represents the packet which is to be output at said specific output port of the crossbar switch 200.

Usually, there is a plurality of ingress packets received at different input ports that are to be routed to the same specific output port of the crossbar switch 200. In this case, the respective entry modules E_1, . . . , E_8 of the scheduler's input stage IS comprise packet references contending to be forwarded via the deciders D_1_1, D_2_1, . . . of the intermediate decider stages DS_1, DS_2 to said last decider stage DS_3 and finally to an output of the last decider module D_3_1. The ingress packet belonging to the packet reference that has been forwarded to the output of the last decider module D_3_1 is the one to be scheduled next, i.e. this packet is routed from its ingress port to the output port the scheduler 100 is assigned to.

According to the present invention, each packet reference is provided with two individual attributes: a size of the packet belonging to the packet reference and a weight of said packet. This enables to make forwarding decisions based on said packet attributes which may e.g. be used to implement a fair scheduling of packets with variable size and/or priority mechanisms. In order to store said individual attributes during the forwarding process within the scheduler 100, an attribute memory symbolized by the block A in FIG. 2 is provided within said scheduler 100.

Although the attribute memory A may be implemented as a separate memory element, in a preferred embodiment of the present invention said attribute memory A is integrated in an existing memory (not shown) of the scheduler 100 or the crossbar switch 200 (FIG. 1), respectively. For instance, said attribute memory A can be implemented together with a packet buffer (not shown) in which the ingress packets are stored and where they can be accessed via the packet reference handled by the scheduler 100. Additionally, for each of said modules E_1, . . . , E_8, D_1_1, . . . , D_2_2 of the scheduler 100 accounting information is stored. Said accounting information is preferably represented by a numerical balance value which enables an efficient comparison of different balance values. Nevertheless, it is also possible to provide the accounting information as a vector or in another form. The accounting information can be used as a kind of processing history in order to store information on the individual attributes of packet references that have already been processed by the scheduler 100.

Figure 3:
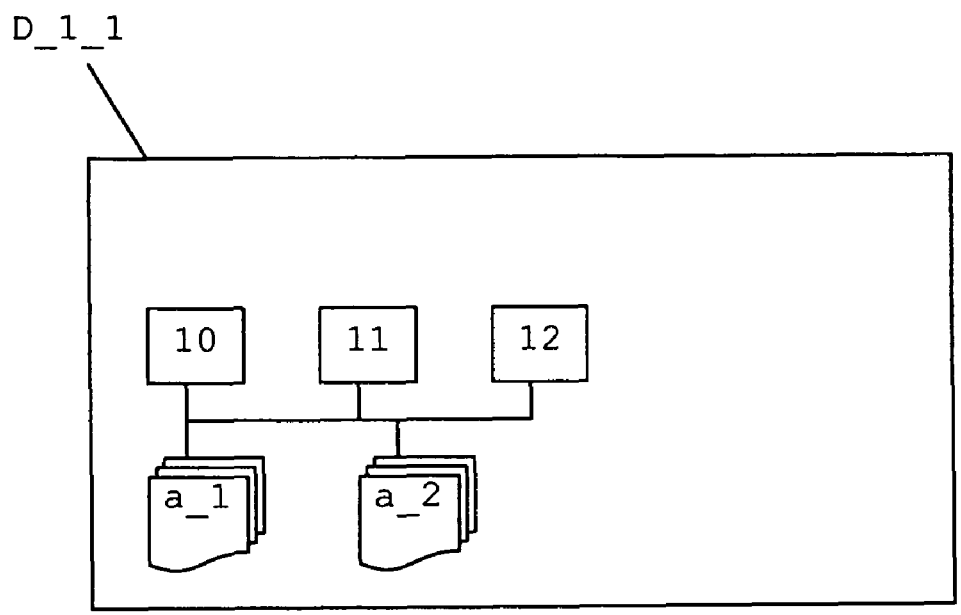
FIG. 3 depicts a decider module of the scheduler of FIG. 2 in detail.

The determination of accounting information and its further use within the inventive scheduler 100 are now described in detail with reference to a forwarding decision of the decider module D_1_1 a detailed block diagram of which is given in FIG. 3. The corresponding processing steps are depicted by the flow chart of FIG. 4. All other decider modules of the scheduler 100 follow the same scheme of operation.

For the present example it is supposed that both entry modules E_1, E_2 (FIG. 2) which are connected to the decider module D_1_1 comprise a packet reference. I.e. there are two ingress packets at the input ports of the crossbar switch 200 (FIG. 1) which are assigned to the entry module E_1 and E_2 respectively, and both ingress packets need to be routed to the output port assigned to the scheduler 100.

The accounting information of the entry modules E_1, E_2 is directly stored in the decider module D_1_1 to which both entry modules E_1, E_2 are connected. To enable an efficient processing of the accounting information, it is stored in form of numerical balance values, wherein the accounting information $a\_1$ is assigned to the first entry module E_1 and wherein the accounting information $a\_2$ is assigned to the second entry module E_2.

To make a forwarding decision within the decider module D_1_1 (FIG. 3), in a first step 300 the balance values $a\_1$ and $a\_2$ are compared with each other, wherein in the present example $a\_1 > a\_2$. For this purpose, the decider module D_1_1 is provided with a comparator 10, cf. FIG. 3.

Figure 4:
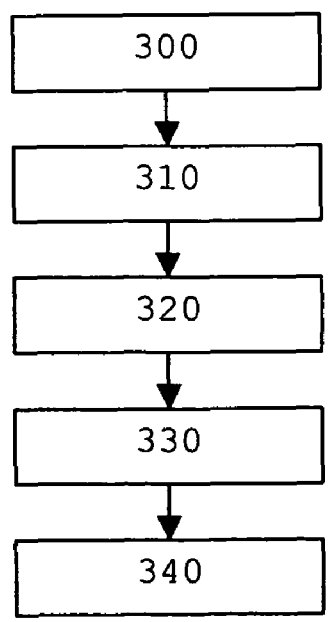
FIG. 4 depicts a simplified flow chart describing an embodiment of the inventive method.

Since the balance value $a\_1$ of the first entry module E_1 is larger than the balance value $a\_2$ of the second entry module E_2, the packet reference assigned to the first entry module E_1 is denoted as a winner regarding the present forwarding decision as is thus forwarded, cf. step 310 of FIG. 4, to a decider module D_2_1 of the next decider stage DS_2 where it may contend with a further packet reference provided to the same decider module D_2_1 by the decider module D_1_2 of the first decider stage, and so on.

In order to account for the forwarding decision presently made by the decider module D_1_1, the balance values a_1, a_2 of the winner, i.e. the first entry module E_1 and of the second entry module E_2 are updated in the following manner:

In step 320 of FIG. 4 a current balance value is obtained as a product of the packet size of the packet represented by the packet reference of the winner entry module E_1, i.e. the packet reference which has been selected to be forwarded, and the weight of the packet referenced by the packet reference of the other entry module E_2. The current balance value is thus proportional to the size of the forwarded packet and to the weight of a packet the packet reference of which has not been forwarded in step 310.

According to the present invention, the current balance value so obtained is subtracted from the larger balance value a_1 corresponding to the winner entry module E_1 within step 330. Thereby, the chance of the first entry module E_1 to win future comparisons (cf. step 300 of FIG. 4) is reduced.

After this, in step 340, said current balance value is furthermore added to the smaller balance value a_2, i.e. the balance value of the second entry module E_2 a packet reference of which has currently not been forwarded. Thereby, the chance of the second entry module E_2 to win future comparisons (cf. step 300 of FIG. 4) is increased and together with step 330 scheduling fairness regarding a variable packet size is ensured.

To enable the decider module D_1_1 to determine the current balance value, step 320, a multiplier 11 is provided within the decider module D_1_1. Furthermore, an adder 12 capable of performing the steps 330, 340 is provided within the decider module D_1_1. The updated balance values a_1, a_2 are finally stored in the decider D_1_1 as already described.

As a further feature of the inventive scheduling process, the weight of the packet corresponding to the forwarded packet reference is incremented by the weight of its opponent, i.e. the weight of the packet corresponding to the packet reference which has not been forwarded.

In case only one of said entry modules E_1, E_2 comprises a packet reference to be forwarded, i.e. there is no opponent for a present forwarding decision, the inventive steps 300, 320, ..., 340 need not be performed. Obviously, the weight of the corresponding packet is not changed in this case.

Generally, an initial weight may be defined for each entry module E_1, ..., E_8, and packet references of ingress packets are provided with the respective weight.

The individual attribute "weight" allows to include priority information in the process of the forwarding decision. For instance, since the current balance value is determined as a product of the size of the winner packet and the weight of the loser packet, the chance of a current winner entry module to win future comparisons is reduced to an extent proportional to the weight of the loser packet. To the same extent the chance of a current loser entry module to win future comparisons is increased, whereby a priority mechanism is implied.

A further priority mechanism can be used by the inventive scheduler 100 and may be implemented by providing a further individual attribute denoted as priority class. Said priority class may e.g. be represented by an integer number. According to this embodiment of the invention, the already described forwarding decision is made depending on the priority class of the contending packet references only if those packet references comprise different priority classes. In this case, no comparison (cf. step 300) of the balance values a_1 and a_2 (FIG. 3) is performed to determine a winner. It is rather performed a comparison of the priority classes of the contending packet references, which may be done by using the existing comparator 10, and the packet reference with the higher priority class is forwarded. Hence, the balance values a_1, a_2 have no influence on a forwarding decision in this case and thus it is possible to implement a strict priority mechanism by using said priority class. Accordingly, in this case, no update of the balance values a_1, a_2 is required.

Only if the contending packet references comprise the same priority class, the inventive method starting with a comparison of the balance values a_1, a_2 and already explained above with reference to FIG. 4 is performed. I.e., in the case of identical priority classes, the forwarding decision is primarily independent of the priority class within this embodiment of the invention.

To implement the strict priority mechanism by using said priority class, each decider module of the scheduler 100 is to be provided with an array of accounting information, wherein for each possible priority class separate accounting information such as balance values, must be stored.

The inventive strict priority mechanism is ideally suited to handle different traffic classes within the inventive scheduler 100.

Although it is considered to be advantageous to locally store the balance values a_1, a_2 within the decider module D_1_1 in which the balance values a_1, a_2 are used to perform the inventive scheduling method, it is also possible to store the balance values in a separate memory or in an existing central memory of the scheduler 100 or the crossbar switch 200.

However, in order to enable a parallel processing of the afore described inventive method steps in each of the decider modules of the scheduler 100, cf. FIG. 2, it is necessary to provide each decider module with an own comparator 10 as already described above. Likewise, for M many entry modules E_1, ..., E_M, there are M−1 many decider modules necessary, and correspondingly M−1 many multipliers 11, provided that all decider modules of the scheduler 100 are to operate in parallel which results in the fastest possible processing. A corresponding number of adders 12 must also be provided if parallelism is desired for the steps 330, 340 of adding/subtracting.

In the case of an overall parallel processing, each decider module drops at its output a forwarded packet reference to an input of a decider module of a subsequent decider stage within the same time slot. Simulations yielded a maximum scheduling rate for the inventive scheduler 100 of about 100 Gbit/s.

A flag indicating whether a decider module can receive a new packet reference at a specific input may be used to signal this condition to a decider module of a previous decider stage.

However, the inventive construction scheme of the scheduler 100 allows for a (partial) serialisation of processing steps, which of course results in a reduced processing speed, but also in a reduced silicon area on a chip into which the inventive scheduler's functionality is incorporated.

As already mentioned above, the scheduler's tree structure 100 of FIG. 2 is provided for each output of the crossbar switch 200, i.e. a high number of identical components is used when implementing the inventive scheduler 100, which enables a simple chip design. In principle, each of the decider modules may have the structure as depicted in FIG. 3. The high modularity enables to provide different schedulers for a wide range of the number of entry modules with a basically identical structure.

In comparison to existing round-robin scheduling schemes, the inventive method provides a guaranteed maximal inter-packet delay as well as the simultaneous handling of different packet weights and sizes.

Further advantages of the present invention are the possibility of defining an initial weight for each entry module $E\_1, \ldots, E\_8$ or even for each packet, and a packet's priority class.

Another advantageous embodiment of the inventive method implements three processes in the scheduling tree system 100, which are triggered by separate input signals or events, respectively:
an incoming packet event,
an outgoing packet event, and
a scheduling step, also denoted as forwarding step.

Advantageously, all entry modules $E\_1, E\_2, \ldots$ have a counter of waiting packets. Further, all entry modules $E\_1, E\_2, \ldots$ and all decider modules $D\_1\_1, D\_1\_2, \ldots$ have two status flags, "free" and "winning", which control the forwarding steps.

A specific module $E\_1$ is "free" if it holds no packet reference.

A specific module $E\_1$ is "winning" if: a) it is not "free", and b) a decider module of a subsequent decider stage to which said specific module is connected is "free" or "winning", and c) the comparisons with competing module(s) design said specific module as the winner, or if the competing opponent module(s) is/are "free".

On each incoming packet event, an incoming packet's reference typically comprises the attributes: size, weight, priority class, output channel number, and entry module where the packet is to be classified. The packet reference is stored in a buffer memory. The packet body of the incoming packet is stored in a queue memory, and a waiting-packet counter stored in the entry module receiving said incoming packet or the packet reference of said incoming packet, respectively, is incremented.

On each outgoing packet event, if there is a packet reference at the last decider stage, it is retrieved, and the corresponding packet body is read from said queue memory and forwarded to the output channel according to said channel number. Subsequently, the module of said last decider stage is marked as "free".

On each scheduling step, processing is parallel in all decider stages $DS\_1, DS\_2, DS\_3$ as well as in the input stage IS: packet references inside the decision tree of the inventive scheduler 100 are forwarded from "winning" modules to the respective modules of subsequent decider stages. Furthermore, the "free" flags of all decider modules $D\_1\_1, D\_1\_2, \ldots$ and entry modules $E\_1, E\_2, \ldots$ are updated as a function of the moves, i.e. depending on which packet references have been forwarded. At the input stage IS, one new packet reference is copied from buffer memory to an entry module if said entry module is qualified, i.e. said entry module is "free" or "winning" and its waiting-packet counter is positive. Correspondingly, said waiting-packet counter of the entry module is then decremented.

Furthermore, on each scheduling step, balance values and weights are updated in the decider modules. The "winning" flags are updated in preparation of the next scheduling step.

In an advantageous embodiment, the inventive scheduler 100 is synchronously clocked, i.e. one scheduling step or forwarding step, respectively, is executed per clock period or time slot, respectively. Simultaneously, if requested, the inventive scheduler 100 executes one incoming and/or one outgoing packet event.

According to a further advantageous embodiment of the present invention, the clock rate is higher, for example by a factor of two, than a fastest rate of outgoing packet events. In this case, the scheduling steps can accumulate enough competing packet references in the scheduler tree 100.

In another advantageous embodiment, the qualified entry module that receives a new packet reference in the scheduling step is chosen by means of a simple round-robin sequencer.

The invention claimed is:

1. A method of operating a scheduler of a crossbar switch, wherein said scheduler comprises a tree structure comprising an input stage with a plurality of entry modules and at least one decider stage, wherein each decider stage comprises at least one decider module, wherein one or more modules are connected to a decider module of a subsequent decider stage, wherein a packet reference is forwarded from said input stage or a decider stage to a subsequent decider stage depending on a forwarding decision that is made in a decider module, comprising the following steps:
providing each packet reference with attributes comprising a packet weight and packet size, storing accounting information for each of said modules;
wherein said accounting information depends on at least one of the packet references and said accounting information is dependent on the packet weight and packet size provided with the packet references which are processed by the respective module; and
making the forwarding decision depending on said accounting information.

2. The method according to claim 1, wherein the accounting information for more than one decider module is stored within a subsequent decider stage to which the more than one decider module is connected.

3. The method according to claim 1, wherein the accounting information for a specific module is stored within a decider module of a subsequent decider stage to which the specific module is connected.

4. The method according to claim 1,
wherein said accounting information is represented by a numerical balance value; and
further comprising determining a current balance value as a product of a packet size of a packet represented by a packet reference of a module with a largest balance value and a weight of a packet represented by another packet reference.

5. The method according to claim 4, wherein the step of making the forwarding decision comprises a step of comparing the balance values of at least two modules which are connected to a specific decider module.

6. The method according to claim 5, wherein the packet reference of the module with the largest balance value is forwarded to a subsequent decider stage.

7. The method according to claim 6, further comprising the following steps:
subtracting said current balance value from the largest balance value; and
adding said current balance value to each of the balance values of the remaining modules.

8. The method according to claim 1, wherein the tree structure of the scheduler is a binary tree structure, wherein two modules are connected to one decider module of a subsequent decider stage.

9. The method according to claim 8, wherein a packet reference is forwarded from a first module of a first stage to a decider module of a subsequent decider stage without said step of comparing balance values, if there is no packet reference waiting to be forwarded in the second module connected to said decider module.

10. The method according to claim 9, wherein a weight of the packet corresponding to the forwarded packet reference is incremented.

11. The method according to claim 1, wherein said attributes of the packet references additionally comprise a priority class.

12. The method according to claim 11, wherein said forwarding decision only depends on said priority class if there are packet references contending to being forwarded to a subsequent decider module that have different priority classes.

13. A scheduler of a crossbar switch for switching variable length packets, wherein said scheduler comprises a tree structure comprising an input stage with a plurality of entry modules and at least one decider stage, wherein each decider stage comprises at least one decider module, wherein one or more modules are connected to a decider module of a subsequent decider stage, wherein said scheduler is configured to forward a packet reference of a variable length packet from said input stage or a decider stage to a subsequent decider stage depending on a forwarding decision that is made in a decider module:
wherein said scheduler comprises an attribute memory for storing individual attributes comprising a packet weight and a packet size of each packet reference and by an accounting memory for storing accounting information for each of said modules, wherein said accounting information depends on at least one of the packet references and the accounting information depends on the attributes of the packet references which are processed by the respective module wherein the packet references correspond to variable length packets.

14. The scheduler according to claim 13, wherein the accounting information is represented by a balance value and the forwarding decision is based on comparing balance values of at least two modules, wherein the at least two modules are connected to a specific decider module; and
wherein a current balance value of the specific decider module is determined based on a size of a first packet represented by a first packet reference associated with a first balance value and a weight of a second packet represented by a second packet reference associated with a second balance value.

15. The scheduler according to claim 13, wherein the tree structure further comprises a binary tree structure, and wherein said tree structure further comprises an input stage and at least one decider stage for each output of said crossbar switch: and
wherein each decider module comprises a comparator and wherein each decider module comprises at least one of a multiplier and an adder.

16. The scheduler according to claim 13, wherein the accounting information is represented by a balance value and the forwarding decision is based on comparing balance values of at least two modules, wherein the at least two modules are connected to a specific decider module, wherein a winning balance value of the at least two modules has a largest balance value of the balance values of the at least two modules and a losing balance value has a balance value less than the winning balance value wherein a winning module comprises the winning balance value, and a losing module comprises the losing balance value; and
a current balance value of the specific decider module is determined based on a size of a packet represented by the packet reference associated with the winning balance value and a weight of a packet represented by the packet reference associated with the losing balance value.

17. The scheduler according to claim 16, wherein the balance value of the winning module is adjusted by subtracting the current balance value of the specific decider module from the balance value of the winning module; and
wherein the weight of the packet corresponding to the packet reference associated with the winning balance value is incremented by the weight of the packet corresponding to the packet reference of the losing balance value.

18. The scheduler according to claim 16, wherein the balance value of the losing module is adjusted by adding the current balance value of the specific decider module to the balance value of the losing module.

19. The scheduler according to claim 13, wherein the accounting information for more than one decider module is stored within a subsequent decider stage to which the more than one decider module is connected.

20. The scheduler of according to claim 13, wherein:
a current balance value is determined as a product of the packet size of the packet represented by said packet reference of a module with a largest balance value and a weight of a packet represented by another packet reference;
subtracting said current balance value from the largest balance value; and
adding said current balance value to each of the balance values of the remaining modules.

* * * * *